United States Patent [19]

Mastumoto et al.

[11] Patent Number: 4,697,478
[45] Date of Patent: Oct. 6, 1987

[54] AUTOMATIC CRUISE CONTROL SYSTEM FOR A MOTOR VEHICLE

[75] Inventors: Makoto Mastumoto, Kure; Mamoru Hayama, Hiroshima, both of Japan

[73] Assignee: Mazda Motor Corporation, Hiroshima, Japan

[21] Appl. No.: 906,500

[22] Filed: Sep. 11, 1986

[30] Foreign Application Priority Data

| Sep. 11, 1985 | [JP] | Japan | 60-200761 |
| Oct. 23, 1985 | [JP] | Japan | 60-235114 |
| Oct. 25, 1985 | [JP] | Japan | 60-238627 |
| Oct. 25, 1985 | [JP] | Japan | 60-238629 |

[51] Int. Cl.$^4$ .................. B60K 41/18; B60K 41/06
[52] U.S. Cl. .................. 74/859; 74/860; 180/179; 180/177
[58] Field of Search .................. 74/859, 860; 180/179, 180/178, 177, 176

[56] References Cited

U.S. PATENT DOCUMENTS

| 4,421,192 | 12/1983 | Ito et al. | 180/179 |
| 4,451,888 | 5/1984 | Kuno et al. | 180/179 X |
| 4,463,822 | 8/1984 | Tanigawa et al. | 74/859 X |
| 4,506,752 | 3/1985 | Hara et al. | 180/179 |
| 4,516,652 | 5/1985 | Tanigawa et al. | 180/177 |
| 4,535,864 | 8/1985 | Tanigawa et al. | 180/177 |
| 4,535,865 | 8/1985 | Tanigawa et al. | 180/177 |
| 4,541,052 | 9/1985 | McCulloch | 180/179 X |

FOREIGN PATENT DOCUMENTS

| 0142046 | 5/1985 | European Pat. Off. | 180/176 |
| 57-196317 | 12/1982 | Japan . | |
| 58-192114 | 11/1983 | Japan . | |
| 59-126148 | 7/1984 | Japan . | |

Primary Examiner—Leslie Braun
Assistant Examiner—Dirk Wright
Attorney, Agent, or Firm—Fleit, Jacobson, Cohn & Price

[57] ABSTRACT

An automatic vehicle cruise speed control system having an electronic control unit for controlling the engine throttle valve in accordance with the vehicle speed to maintain the speed at a substantially constant value. In an operation on a slope, the transmission gear stages are shifted down to a lower stage when the actual vehicle speed is deviated from a desired speed by more than a predetermined value consecutively for a first time period and shifted up to a higher stage when the actual speed is recovered so that the speed deviation is smaller than the predetermined value for a second time period which is greater than the first time period.

13 Claims, 12 Drawing Figures

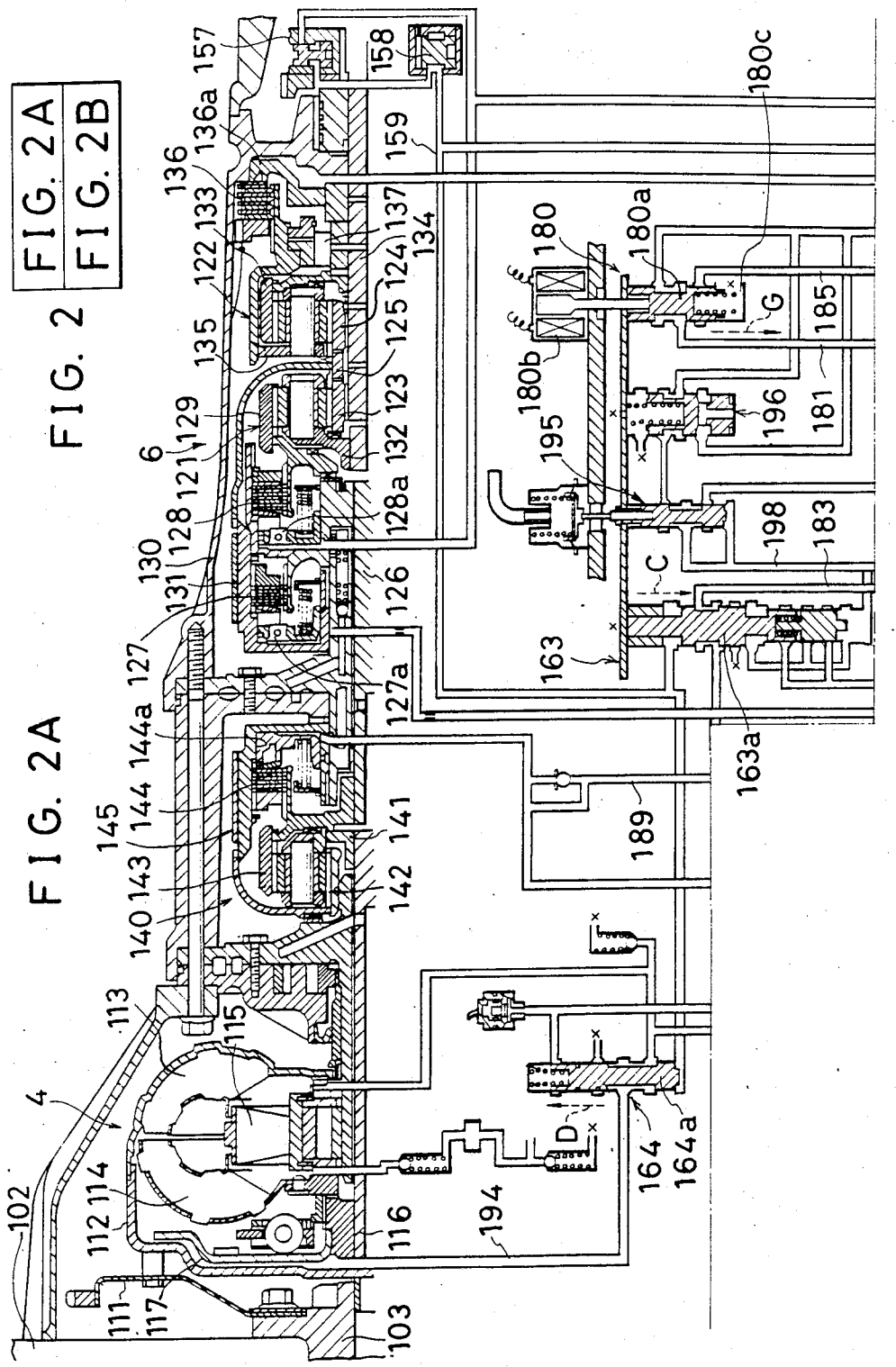

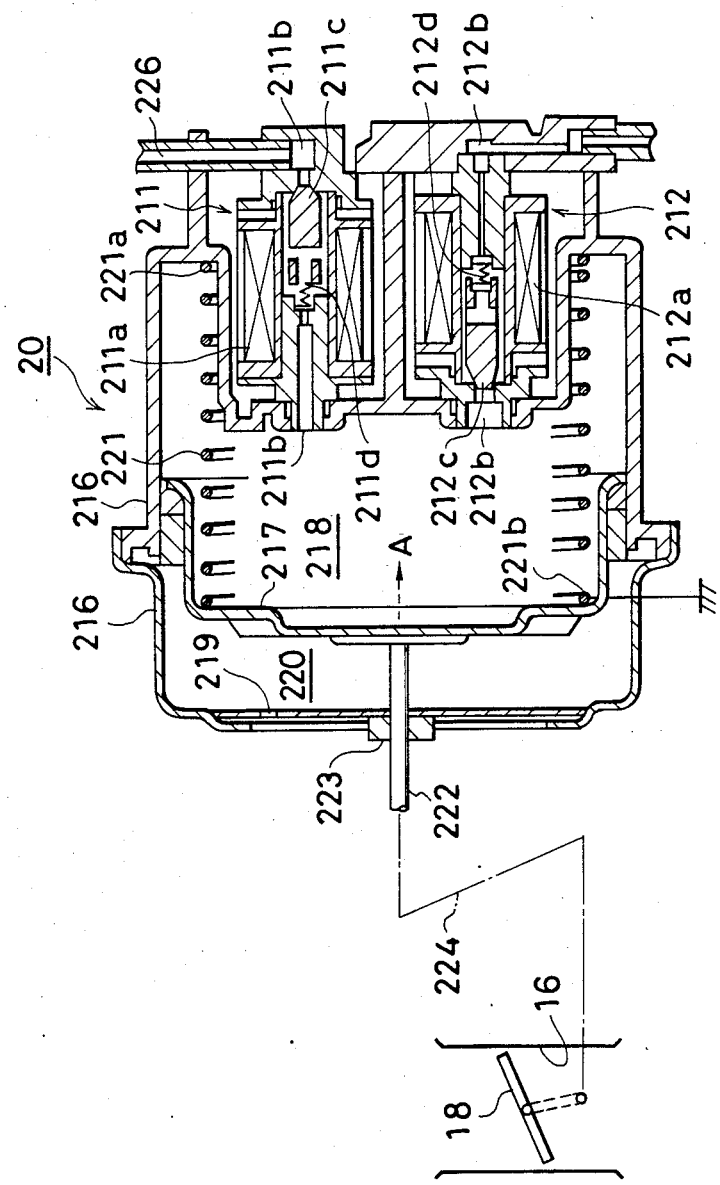

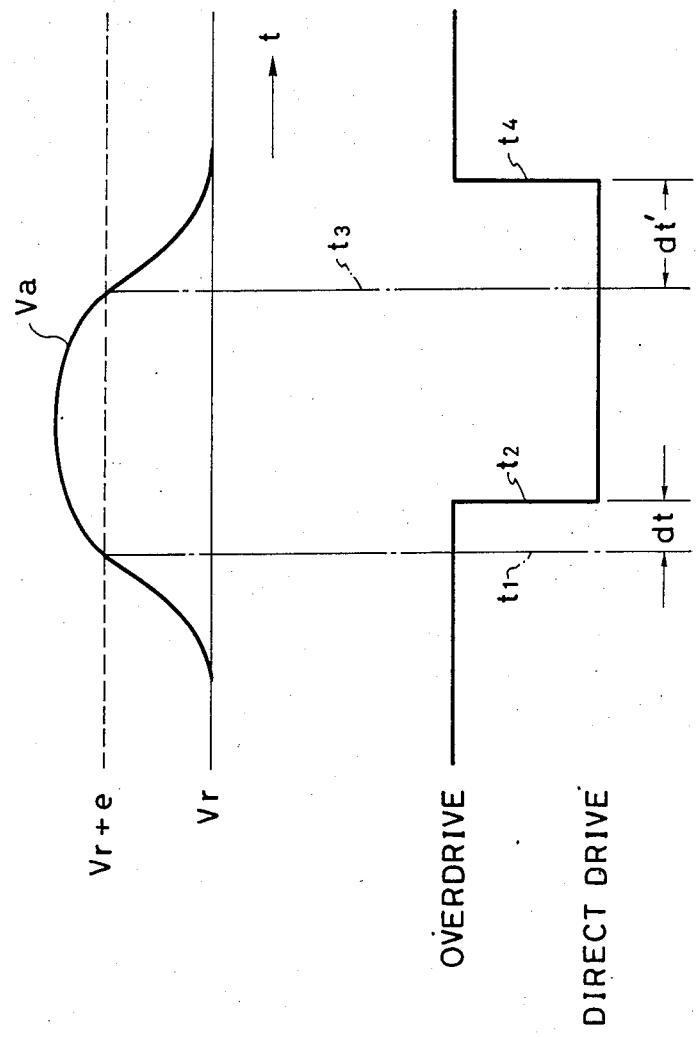

AUTOMATIC CRUISE CONTROL SYSTEM FOR A MOTOR VEHICLE

BACKGROUND ON THE INVENTION

1. Field of the Invention

The present invention relates to a motor vehicle control, and more particularly to an automatic cruise speed control of a motor vehicle. More specifically, the present invention pertains to an automatic constant cruise speed control of a motor vehicle.

2. Description of the Prior Art

In recent years, there are motor vehicles which are provided with automatic speed control systems with which the vehicle speeds are automatically controlled at desired speeds without necessitating actuations of the vehicle accelerator pedals. In these motor vehicles, the operator is required only to adjust the vehicle speed at a desired value and press the control start switch. The control unit memorizes the vehicle speed at which the control switch is actuated and automatically controls an engine output control member such as the engine throttle valve or the fuel control unit.

In a motor vehicle having the aforementioned automatic control system, when the vehicle comes to an uphill slope, the control unit functions to open the engine throttle valve or to increase the fuel supply to the engine so that the desired vehicle speed is maintained. It should however be noted that when the engine throttle valve is fully open but the vehicle speed still continues to decrease it is no longer possible to maintain the desired vehicle speed. Thus, it will become necessary to shift down the vehicle transmission. In a vehicle having an automatic transmission, such shift down may be conducted by fully depressing the accelerator pedal to close the kick-down switch. Thus, the operator will be required to make an additional operation in order to maintain a desired speed in an uphill slope.

In view of the above inconveniencies, Japanese patent disclosure No. 58-192114 proposes a control system wherein the vehicle transmission is automatically shifted down when the vehicle speed is decreased. According to the proposal, control circuits are provided for judging that the actual vehicle speed is decreased below a reference speed by a predetermined value and that the engine throttle valve is in the wide open position and shifting the transmission down to a lower gear stage. In the proposed system, it will be possible to recover the vehicle speed to the desired value even when there is a certain drop in the uphill drive. It should however be noted that there is a high possibility that the transmission is frequently shift down and up in an uphill operation producing a gear shift shock in each gear shift operation.

In case where the vehicle provided with an automatic transmission having an overdrive gear stage wherein the gear ratio is smaller than 1.00, it becomes difficult to obtain an engine brake effect in an operation on a steep downhill slope with the overdrive gear stage. Thus, the vehicle speed may increase beyond the desired value even when the engine throttle valve is fully closed. In order to solve the problem, the aforementioned Japanese patent disclosure proposes to shift down the transmission to the direct drive gear stage. With this control, it may become possible to maintain the vehicle speed substantially at the desired value. It should however be noted that, even in this control, the transmission will be shifted down and up very frequently possibly producing unpleasant gear shift shocks.

In the Japanese patent disclosure No. 57-196317, there is disclosed a vehicle speed control in which the transmission gear stage is shifted down when the vehicle speed is decreased below a desired value by a first predetermined value, for example 7 km/h, and shifted up when a predetermined delay time has passed after the vehicle speed is increased to a second predetermined value, for example, 3 km/h which is higher than the first predetermined value. By providing the delay time, the control system may be effective to a certain extent to suppress the frequent shifting operations. It should however be noted that the proposed system is not satisfactory because two reference speed values are provided and therefore the first predetermined value must be deviated from the desired speed by an amount which is not so small. Thus, there is a possibility that the vehicle speed may be decreased to a value slightly higher than the first predetermined value and maintained at the value.

SUMMARY OF THE INVENTION

It is therefore an object of the present invention to provide a vehicle automatic speed control system in which frequent gear shiftings can be avoided.

Another object of the present invention is to provide a vehicle automatic constant speed control system which can maintain the vehicle speed substantially constant even on an uphill slope but can avoid excessively frequent gear shiftings.

A further object of the present invention is to provide a vehicle automatic speed control system which can maintain the vehicle speed substantially constant under a relatively steep downhill slope without accompanying frequent gear shiftings.

According to the present invention, the above and other objects can be accomplished by a vehicle automatic cruise speed control system including gear stage shifting means for effecting shifting operations of gear stages of a vehicle automatic transmission, engine output control means for controlling the output of a vehicle engine, vehicle speed detecting means for detecting vehicle speed and producing a vehicle speed signal, first control means responsive to said vehicle speed signal and controlling said first control means in accordance with the vehicle speed signal for maintaining the vehicle speed at a desired value, speed descriminating means for producing a deviation signal when the vehicle speed signal is deviated from a reference signal representing the desired speed by a predetermined value, second control means responsive to said deviation signal for actuating said gear stage shifting means to shift down said gear stages of the automatic transmission when the deviation signal is continuously received for a first predetermined time period and to shift up said gear stages of the automatic transmission when the deviation signal is not continuously received for a second time period from a time when the deviation signal has disappeared.

The engine output control means may be an engine throttle valve for controlling the engine intake air flow or may alternatively be fuel supply control means of any type. The first and second predetermined time periods may be of the same value, however, in a preferable mode, the second predetermined time period is longer than the first predetermined time period. The first and second predetermined time period may preferably be variable in accordance with the vehicle operating condition. For example, the timeperiods may be changed depending on the rate of change in the vehicle speed. More specifically, the first time period may be descreased in response to an increase in the rate of change of the vehicle speed and the second time period may be increased in response to an increase in the rate of change in the vehicle speed. According to the features of the present invention, it is possible to prevent frequent shifting operations even when the vehicle is running on a long uphill or downhill slope.

The above and other objects and features of the present invention will become apparent from the following descriptions of preferred embodiments taking reference to the accompanying drawings.

BRIEF DESCRIPTION OF THE DRAWINGS

FIG. 2A is a sectional view of an automatic transmission, a part of the hydraulic transmission control system being shown together;

FIG. 3 is a sectional view of a throttle valve actuator adopted in the speed control system;

FIG. 7 is a diagram showing another example of the vehicle speed control;

DESCRIPTION OF THE PREFERRED EMBODIMENT

Figure 1:
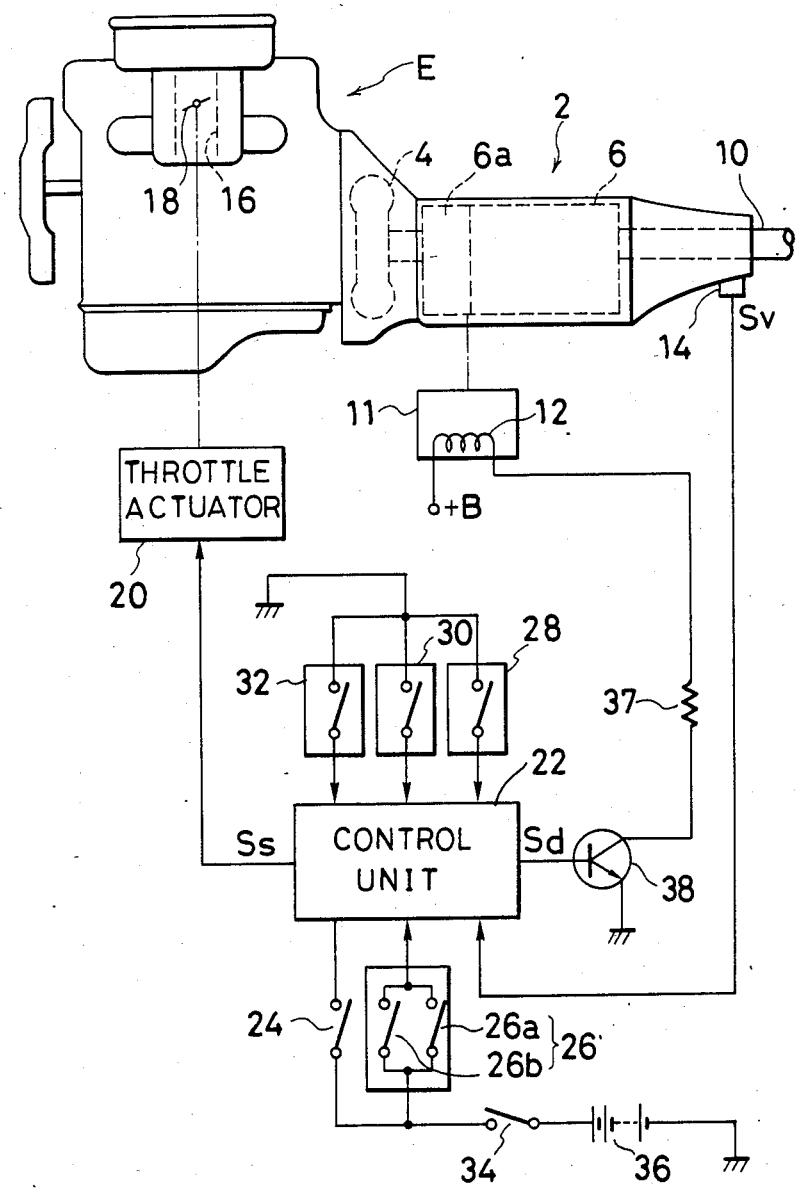
FIG. 1 is a fragmentary illustration of a vehicle speed control system in accordance with one embodiment of the present invention.

Referring to the drawings, particularly to FIG. 1, there is shown an engine E which is provided with a carburetor having an intake passage 16 and a throttle valve 18 located in the intake passage 16. The engine E has an output shaft (not shown) connected with an automatic transmission which includes a torque converter 4, an overdrive transmission mechanism 6a, a multiple stage gear transmission mechanism 6 and an output shaft 10. The transmission 2 is provided with actuator means 11 for controlling shifting operations the gear transmission mechanism 6. An throttle actuator 20 is provided for actuating the throttle valve 18.

Figure 2B:
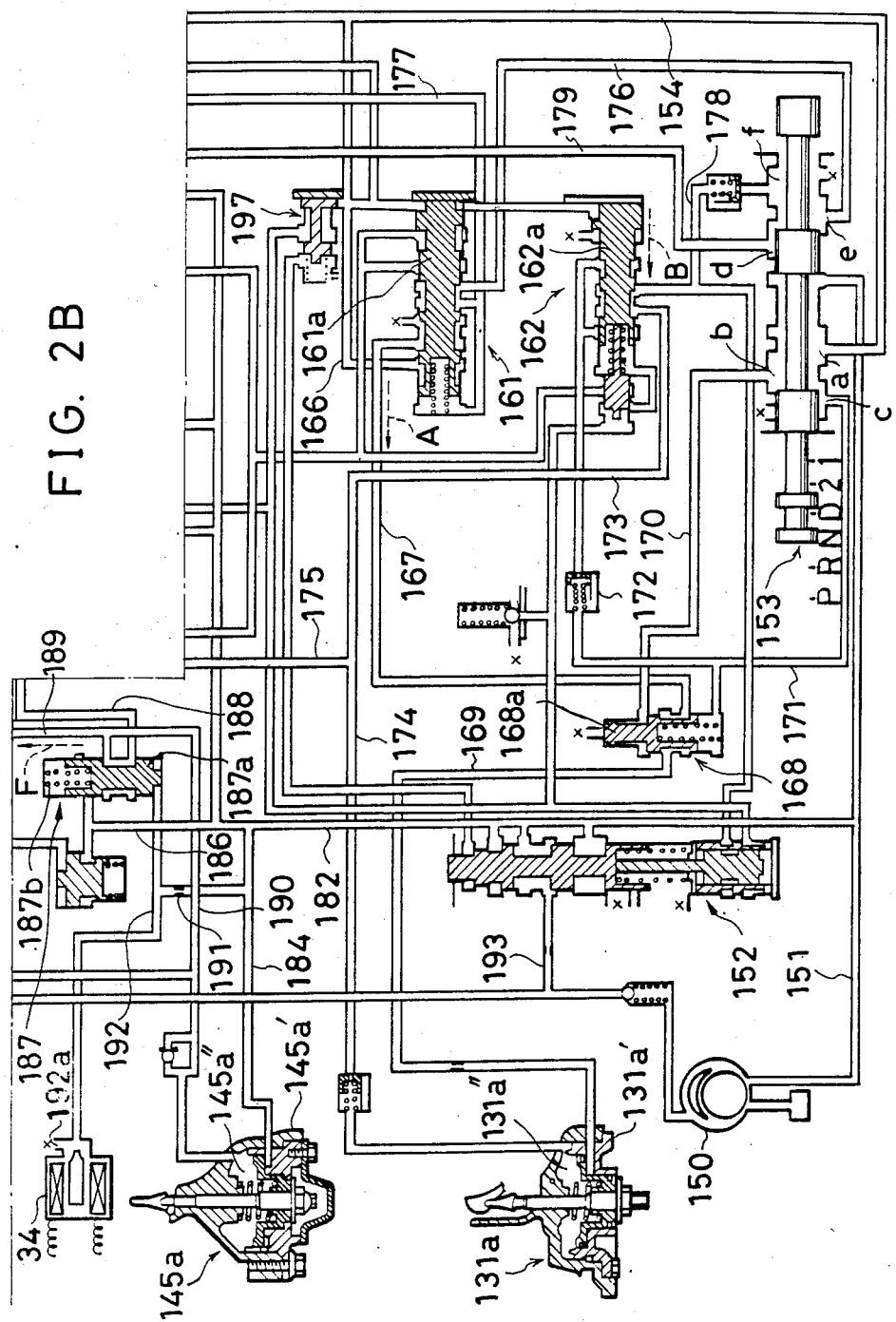
FIG. 2B shows the remaining part of the hydraulic transmission control system.

Referring to FIGS. 2A and 2B, there are shown details of the automatic transmission 2. As shown, the torque converter 4 has a pump 113 connected to an output shaft 103 of an engine E through a drive plate 111 and a converter casing 112, a turbine 114 provided in the casing 112 to face to the pump 113 and a stator 115 disposed between the pump 113 and the turbine 114. A converter output shaft 116 is connected to the turbine 114. A lock-up clutch 117 is provided between the converter output shaft 116 and the casing 112 which is connected to the pump 113. The lock-up clutch 117 is normally engaged with the casing 112 under the pressure of a hydraulic fluid which circulates in the torque converter 110, and is released by hydraulic pressure which is drawn to a space between the casing 112 and the clutch 117 from an external pressure source.

The multiple stage transmission gear mechanism 6 has a front planetary gear unit 121 and a rear planetary gear unit 122. The front planetary gear unit 121 has a sun gear 123 connected with a sun gear 124 of the rear planetary gear unit 122 by way of a connecting rod 125. The gear mechanism 6 has an input shaft 126 connected through a front clutch 127 with the connecting rod 125 and through a rear clutch 128 with an internal gear 129 of the front planetary gear unit 121. A front brake 131 is provided between the connecting rod 125 or the sun gears 123 and 124 of the gear units 121 and 122, and a casing 130 of the transmission. The gear mechanism 120 also has an output shaft 134 connected with a planetary carrier 132 of the front planetary gear unit 121 and an internal gear 133 of the rear planetary gear unit 122. The rear planetary gear unit 122 has a planetary carrier 135, and there are provided between the planetary carrier 135 and the transmission casing 130 a rear brake 136 and a one-way clutch 137.

The planetary gear type over-drive transmission mechanism 6a includes planetary gears 141a, a planetary carrier 141 rotatably carrying the planetary gears 141a and connected with the output shaft 116 of the torque converter 110, a sun gear 142 engaged with the planetary gears 141a, and an internal gear 143 which is also engaged with the planetary gears 141a and connected with the sun gear 142 through a direct connecting clutch 144. An over-drive brake 145 is provided between the sun gear 142 and the transmission casing 130. The internal gear 143 is connected with the input shaft 126 of the multiple stage transmission gear mechanism 120.

The multiple stage transmission gear mechanism 120 is of a known type and can provide three forward speeds and one reverse. The planetary gear type overdrive transmission mechanism 140 connects the shafts 116 and 126 directly when the direct connection clutch 144 is engaged and the brake 145 is released, and provides an over-drive connection between the shafts 116 and 126 when the brake 145 is engaged and the clutch 144 is released.

As shown in FIGS. 2A and 2B, the automatic transmission 2 is provided with a hydraulic control circuit. The hydraulic control circuit has an oil pump 150 which is driven by the engine output shaft 103 through the torque converter 4. Hydraulic oil is discharged under pressure from the pump 150 into a pressure line 151. The oil pressure is reduced by a pressure regulating valve 152 and applied to a select valve 153. The select valve 153 has a plunger which can be selectively positioned in one of shift positions 1, 2, D, N, R and P. When the select valve 153 is positioned in the position D, the pressure line 151 is communicated with the ports a, b and d of the select valve 153 whereas in the position 1, the line is communicated with the ports a, d, and e. In the position R, the line 151 is communicated with the ports d, e and f. The port a is communicated through a line 154 with a hydraulic actuator 128a for the rear clutch 128. It will be understood that when the select valve 103 is positioned in any one of the positions D, 2 and 1, the actuator 128a causes the rear clutch 128 to engage.

The line 154 from the port a is connected with a second governor valve 157 which is provided on the output shaft 134 of the transmission gear mechanism 120. The second governor valve 157 as an output port connected with a first governor valve 158 which is also provided on the output shaft 134. The first governor valve 158 has an output port connected with a governor pressure line 159. The governor valves 157 and 158 produce a governor pressure which is substantially proportional to the rotating speed of the output shaft 134. The governor pressure line 159 is connected with a 1–2 shift valve 161, a 2–3 shift valve 162, a 3–4 shift valve 63 and a lock-up valve 164 to apply the governor pressure to these valves so that spools 161a, 162a, 163a and 164a of these valves are forced respectively in the directions shown by arrows A, B, C and D.

The port a is also communicated through a line 166 branched from the line 154 with the 1–2 shift valve at a port which is communicated with a line 167 when the spool 16 a is shifted in the direction of the arrow A under the governor pressure introduced at the right hand end of the spool 161a. The line 167 leads to a second lock valve 168 having a spool 168a which is urged upward by a spring. With the select valve 153 in the position D, hydraulic pressure is applied from the port b and c through lines 170 and 171 respectively to the second lock valve 168 and the hydraulic pressure functions to keep the spool 68a in the position shown in FIG. 2. In this position of the spool 168a, the line 167 is communicated with a line 169 leading to an engaging port 131a' of an actuator 131 for the front brake 131. It will be understood that when the spool 161a of the 1–2 shift valve 162 is moved in the direction of the arrow A, hydraulic pressure is led to the engaging port 131a' of the actuator 131a to cause the front brake 131 to engage.

The line 171 from the port c of the select valve 153 is connected through an orifice check valve 172 with the 2–3 shift valve 162 at a port which is communicated with a line 173 when the spool 162a is moved in the direction of the arrow B under the governor pressure applied to the right hand end of the spool 162a. The line 173 is branched into lines 174 and 175, the line 174 being connected to a release port 131a" of the actuator 131a for the front brake 131 and the line 175 to an actuator 127a for the front clutch 127. It will be understood that the front brake 131 is released and the front clutch 127 is engaged when the spool 162a of the 2–3 shift value 162 is moved to the left position under the governor pressure.

The port c of the select valve 153 is disconnected from the pressure line 151 when the select valve 153 is in the position 2. Since the port b is still in communication with the pressure line 151, the spool 168a of the second lock valve 168 is moved in the direction of arrow E to thereby connect the line 169 with the line 170. Thus, hydraulic pressure is introduced through the lines 170 and 169 to the engaging port 131a' of the actuator 131a to cause the front brake 131 to engage irrespective of the position of the spool 161a of the 1–2 shift valve 161.

The port e is connected with the pressure line 151 when the select valve 153 is in either one of the positions 1 and R. The port e is connected through a line 176 to the 1–2 shift valve 161 at a port which is communicated with a line 177 when the spool 161a is in the right position as shown in FIG. 2. Thus, in this position of the spool 161a, the rear brake 136 is engaged under a hydraulic pressure applied through the line 177 to an actuator 136a.

The select valve 153 further has a port f which is communicated with the pressure line 151 when the select valve 153 is in the position R. The port f is connected through a line 178 with the 2–3 shift valve 162 at a port which is communicated with the line 173 when the spool 162a is in the position at the right shown in FIG. 2. Thus, hydraulic pressure is applied in the position R to the actuator 127a to engage the front clutch 127. The hydraulic pressure is also applied to the release port 131a" of the actuator 131a, though the pressure does not provide any change in the actuator 131a because it has been in the release position since it is not supplied with hydraulic pressure at the engaging port 131a' in the position R of the select valve 153.

The port d which is in communication with the pressure line 151 in any one of the positions 2, 1 and R is connected with a line 179 leading to a kick-down valve 180. The valve 180 has a spool 180a which is urged upward by a spring 180c and actuated by a kick-down solenoid 180b. In the upward position of the spool 180a, the valve 180 connects the line 170 with a line 181 which leads to the 1–2 shift valve 161, the 2–3 shift valve 162 and the 3–4 shift valve 163. When the hydraulic pressure is applied from the line 181, spools 161a, 162a and 163a of the respective valves 161, 162 and 163 are held in the positions shown in FIG. 2.

The pressure line 151 is further connected with a branch line 182 which leads through lines 183, 184, 185 and 186 respectively to the 3–4 shift valve 163, and engaging port 145a' of an actuator 145a for the overdrive brake 145, the kick-down valve 180 and an overdrive release valve 187. The line 183 leading to the 3–4 shift valve 163 is communicated through a line 188 with the overdrive release valve 187 when the spool 163a of the shift valve 163 is in the position shown in FIG. 2. The line 188 is communicated, when the spool 187a of the valve 187 is in the position shown in FIG. 2, through lines 189 and 190 respectively with an actuator 144a for the direct drive clutch 144 and a release port 145a" of the actuator 145a for the overdrive brake 145. It will be understood that, in the positions of the valves shown in FIG. 2, the direct drive clutch 144 is engaged and the overdrive brake 145 is released. When the spool 63a of the 3–4 shift valve 163 is moved in the direction of the arrow C under the governor pressure, the line 183 is disconnected from the line 188 and the line 188 is opened to the drain port. Therefore, the pressure is released from the actuator 144a and the release port 145a' of the actuator 145a so that the direct drive clutch 144 is released and the overdrive brake 145 is engaged.

The line 186 leading to the overdrive release valve 187 is normally closed by the spool 187a of the valve 187 as shown in FIG. 2. When the spool 187a is moved in the direction of arrow F, the line 186 is communicated with the lines 189 and 190 to thereby engage the direct drive clutch 144 and release the overdrive brake 145. In order to effect the aforementioned movement of the spool 187a, the line 184 is connected with the lower end portion of the spool 187a through a line 192 which has an orifice 191. A downshifting solenoid valve 234 of a normally open type is provided in a drain port 192a of the line 192. It will be understood that the line 192 is normally opened to the drain port 192a so that the spool 187a of the valve 187 is held in the position shown in FIG. 2 under the influence of a spring 187b. When the downshifting solenoid valve 234 is energized to close the drain port 192a, a pressure is built up in the line 192 so that the spool 187a is shifted in the direction of the arrow F. In the illustrated embodiment, the solenoid valve 234 constitutes the actuator means 11 and includes a solenoid coil 12.

162 and the 3-4 shift valve 163 to force the spools 162a and 163a in the valves 162 and 163 in the directions opposite to the arrows B and C. The relation of the operation of the clutched 127, 128, 137 and 144 and the brake 131, 136 and 145 to the transmission speeds is shown in the table.

TABLE

| SELECT VALVE | GEAR STAGE | FRONT CLUTCH 27 | REAR CLUTCH 28 | FRONT BRAKE 31 | REAR BRAKE 36 | ONE-WAY CLUTCH 37 | DIRECT DRIVE CLUTCH 44 | OVERDRIVE BRAKE 45 |
|---|---|---|---|---|---|---|---|---|
| P | | | | | | | o | |
| R | | | o | | o | | o | |
| N | | | | | | | o | |
| D | 1 | | o | | | o | o | |
|   | 2 | | o | o | | | o | |
|   | 3 | o | o | | | | o | |
|   | 4 | o | o | | | | | o |
| 2 | | | o | o | | | o | |
| 1 | 1 | | o | | o | | o | |
|   | 2 | | o | o | | | o | |

The line 185 leading to the kick-down valve 180 is normally closed by the spool 180a of the valve 180. The spool 180a of the kick-down valve 180 is shifted in the direction of arrow G when the solenoid 180b is energized, and in the shifted position of the spool 180a, the line 185 is connected with the line 181. As described above, the line 181 is in communication with the line 179 from the port d of the select valve 153 when the solenoid 180b is de-energized. The port d is opened to the drain port when the select valve 153 is in the position D so that no pressure is built up in the line 181 in this instance. When the solenoid valve 180b is energized, however, the pressure is supplied from the line 185 to the line 181 and the pressure functions to hold the spools 161a, 162a and 163a of the shift valves 161, 162 and 163 in the positions shown in FIG. 2 when the spools are in the illustrated positions. When any one or all of the spools 161a, 162a and 163a are in the positions shifted in the directions of the arrows A, B and C, the pressure in the line 181 counteracts the governor pressure applied to the spools and moves the spools to the illustrated positions when the pressure in the line 181 overcomes the governor pressure.

The pressure regulating valve 152 has a port which is connected to a line 913 leading to the lock-up valve 164 having a spool 164a. With the spool 164a in the position shown in FIG. 2, the line 193 is connected with a line 914 to supply a hydraulic pressure to the torque coverter 110 to thereby force the lock-up clutch 117 toward the released position. As described above, the governor pressure is applied through the line 159 to the lower end of the spool 164a. Further, the pressure in the line 190 is applied to the upper end of the spool 164a. It will be understood that as the governor pressure increases beyond a predetermined valve, it overcomes the force applied by the pressure in the line 190 and causes the spool 164a to move in the direction of the narrow D. Thus, the line 194 is disconnected from the line 193 and opened to the drain port to thereby cause the lock-up clutch 117 to engage.

The hydraulic system further includes a vacuum 195 for producing a throttle pressure corresponding to the opening of the throttle valve of the engine. Further, there is provided a throttle back-up valve 196 for supplementing the vacuum throttle valve 195 and a pressure modifier valve 197 for modifying the output pressure of the valve 152. The throttle pressure from the valve 195 is led through a line 198 to the 2-3 shift valve As shown in FIG. 3, the actuator 20 is of a negative pressure diaphragm type and comprises a casing 216. The internal space of the casing is parted into a negative pressure chamber 218 and an atmospheric pressure chamber 220 by a diaphragm 217 formed of rubber. The negative pressure chamber 218 is isolated from the exterior in an airtight fashion, and on the other hand, the atmospheric pressure chamber 220 opens to the atmosphere by way of a communication hole 219. The diaphragm 217 is urged toward the atmospheric pressure chamber 220 by a spring 221 disposed in the negative pressure chamber 218. There are provided a negative pressure introducing solenoid valve 211 for controlling the negative pressure to be introduced into the negative pressure chamber 218 and an air introducing solenoid valve 212 for introducing the atmospheric air into the negative pressure chamber 218 which is mounted on an end face of the casing 216. A rod 222 connected to the diaphragm 217 extends through the atmospheric pressure chamber 220 and is supported for sliding movement by a bearing portion 223 provided on the casing 216. The rod 222 is connected to a throttle valve 18 in the intake passage 16 of the engine by way of a wire 224 so that the throttle valve 18 is opened in response to a movement of the diaphragm 217 toward the negative pressure chamber 218 or in the direction of arrow A in FIG. 3.

The negative pressure introducing solenoid valve 211 comprises a valve member 211c for selectively opening and closing a passage 211b which is connected at one end to a negative pressure introducing pipe 226 leading to a negative pressure source and opened at the other end to the negative pressure chamber 218. The valve member 211c is urged by a spring 211d to close the passage 211b and is moved to open the passage 211b overcoming the force of the spring 211d when the solenoid 211a is energized. The atmospheric pressure introducing solenoid valve 212 comprises a valve member 212c for selectively opening and closing a passage 212b which is opened at one end to the atmosphere and at the other end to the negative pressure chamber 218. The valve member 212c is urged by a spring 212d to open the passage 212b and is moved to close the passage 212b overcoming the force of the spring 212d when the solenoid 212a is energized.

Referring again to FIG. 1, there is provided a control unit 22 which is connected with an electric power source 36 through a main switch 24 and an engine ignition switch 34. In parallel with the main switch 24, there is provided a cancel switch 26 including a brake switch contact 26a and a parking switch contact 26b. The brake switch contact 26a is closed when the vehicle brake is actuated to apply the control unit 22 with a cancel signal. The parking switch contact 26b is closed when the vehicle parking mechanism is actuated to apply to control unit 22 with a cancel signal. The main switch 24 is of a normally open type and supplies the electric power to the control unit 22 when it is closed manually. The control unit 22 is further connected with a set switch 28, an acceleration switch 30 and a deceleration switch 32 which are of normally open type and arranged in parallel with each other. When the set switch 28 is closed, a set signal is applied to the control unit 22. When the acceleration switch 30 is closed, an acceleration signal is applied to the control unit 22. Similarly, when the deceleration switch 32 is closed, a deceleration signal is applied to the control unit 22.

A vehicle speed detector 14 is provided on the output shaft 10 of the transmission 2 to produce a vehicle speed signal which is applied to the control unit 22. The solenoid coil 12 of the actuator means 11 is connected with the control unit 22 through a resistor 37 and a transistor 38.

The throttle actuator 20 is also connected with the control unit 22. When the main switch 24 is closed and the set switch 28 is also closed, a set signal is applied to the control unit 22 whereby the control unit 22 stores in the memory the vehicle speed at the instance as the reference speed. When the acceleration switch 30 is closed under this condition, an acceleration signal is applied to the control unit 22 so that the control unit 22 produces an output signal $S_s$ which is applied to the throttle actuator 20 to thereby increase the opening of the throttle valve 18. When the deceleration switch 32 is closed, a deceleration signal is applied to the control unit 22 which then produces an output signal $S_s$ to actuate the throttle actuator 20 in the direction of decreasing the throttle valve opening.

Assuming that the vehicle is running with the transmission 2 in the overdrive gear stage and the main switch 24 is closed, the operator closes the set switch 28 at a desired speed $V_r$ to start the constant speed control. The control unit 22 then memorizes the speed $V_r$ as the reference speed and compares the actual speed $V_a$ as obtained from the vehicle speed signal $S_v$ from the speed detector 14. The control unit 22 produces an output $S_s$ depending on the difference between the actual vehicle speed $V_a$ and the reference speed $V_r$ and applies the output signal $S_s$ to the throttle actuator 20 to thereby energize the solenoid valves 211 and 212 to maintain the vehicle speed substantially at the reference speed.

Figure 4:
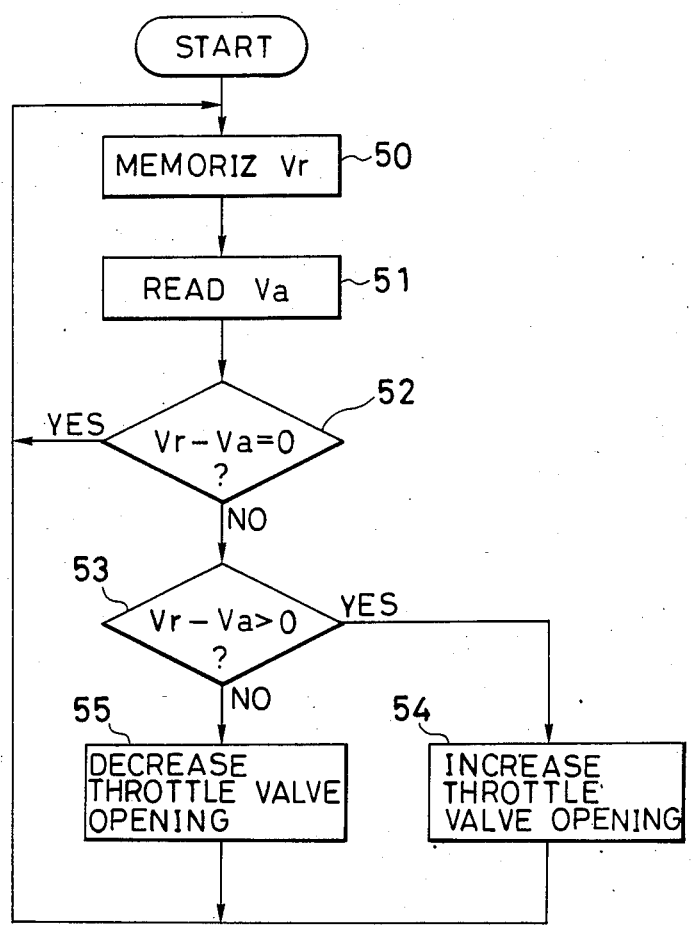
FIG. 4 is a program flow chart showing the vehicle speed control.

The control unit 22 is constituted by a microprocessor which is programmed to operate as shown in FIG. 4. Referring to FIG. 4, the reference speed $V_r$ is at first provided in the step 50 when the set switch 28 is closed. Then, the actual vehicle speed $V_a$ is read in the step 51 and the actual vehicle speed $V_a$ is compared with the reference speed $V_r$ in the step 52. When the actual vehicle speed $V_a$ is substantially the same as the reference speed $V_r$, the step 50 is repeated.

When it is judged that the actual vehicle speed $V_a$ is different from the reference speed $V_r$, it is then judged in the step 53 as to whether the reference speed $V_r$ is larger than the actual speed $V_a$. If the reference speed $V_r$ is larger than the actual speed $V_a$, the step 54 is carried out to increase the opening of the throttle valve 18. To the contrary, if the reference speed $V_r$ is smaller than the actual speed $V_a$, the step 55 is carried out to decrease the opening of the throttle valve 18.

Figure 5:
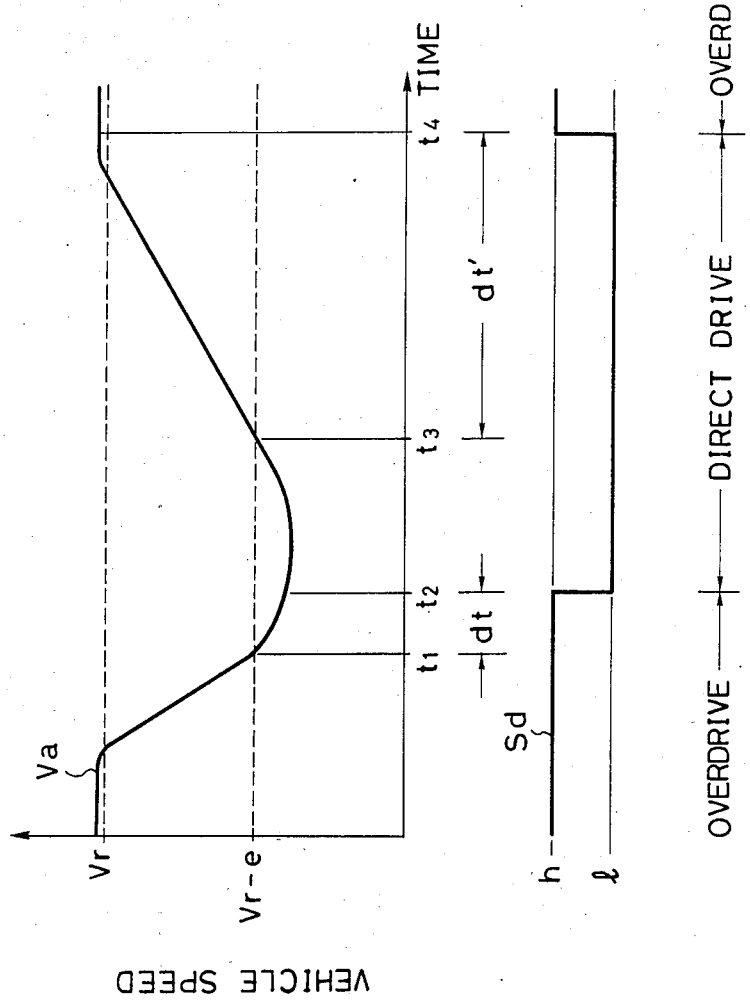
FIG. 5 is a diagram showing an example of the vehicle speed control.

When the vehicle comes to an uphill slope, the engine load increases so that the throttle valve 18 is gradually opened. Depending on the steepness of the slope and the desired vehicle speed, the desired speed may not be maintained even when the throttle valve 18 is fully opened. Then, as shown in FIG. 5, the vehicle speed decreases below the desired speed $V_r$. When the vehicle speed $V_a$ decreases below the reference speed $V_r$ by a predetermined value e at a timing $t_1$, the control unit 22 starts to count the time from the timing $t_1$. At a second timing $t_2$ when a first time period dt, for example, 3 seconds, has passed from the timing $t_1$, if it is found that the difference between the reference speed $V_r$ and the actual speed $V_a$ is greater than the value e throughout the period dt, the control unit 22 produces a high level signal $S_d$ which is applied to the transistor 38 to make the transistor 38 conductive, Thus, the solenoid coil 12 is energized and the downshifting solenoid valve 234 is closed. This will cause the overdrive gear mechanism 6a to be shifted down to the direct drive stage. Due to the downshifting, the engine output torque is increased so that the vehicle recovers the speed and at the timing $t_3$ the vehicle speed $V_a$ becomes equal to the value $V_r - e$. Then, the control unit 22 starts to count the time. At the timing $t_4$ when a second time period dt', for example, 15 seconds, has passed from the timing $t_3$, if it is found that the difference between the reference speed $V_r$ and the actual speed $V_a$ is smaller than the predetermined value e throughout the time period dt', the control unit 22 produces a low level output signal $S_d$ which is applied to the transistor 38 to make the transistor 38 non-conductive. Thus, the solenoid coil 12 is deenergized to open the downshift solenoid valve 234. This will cause the overdrive gear mechanism 6a to be shifted up to the overdrive gear stage. It is preferable to determine the second time period dt' to be larger than the first time period dt because it will become more likely that the vehicle speed has recovered the value $V_r$ before the second time period has passed. According to the control just described, it is possible to make the value e relatively small because the shifting down is carried out after a delay time dt when the speed difference has become larger than the value e. It is therefore possible to maintain the actual vehicle speed close to the desired value. Further, the control is advantageous in that it requires only one reference speed.

Figure 6:
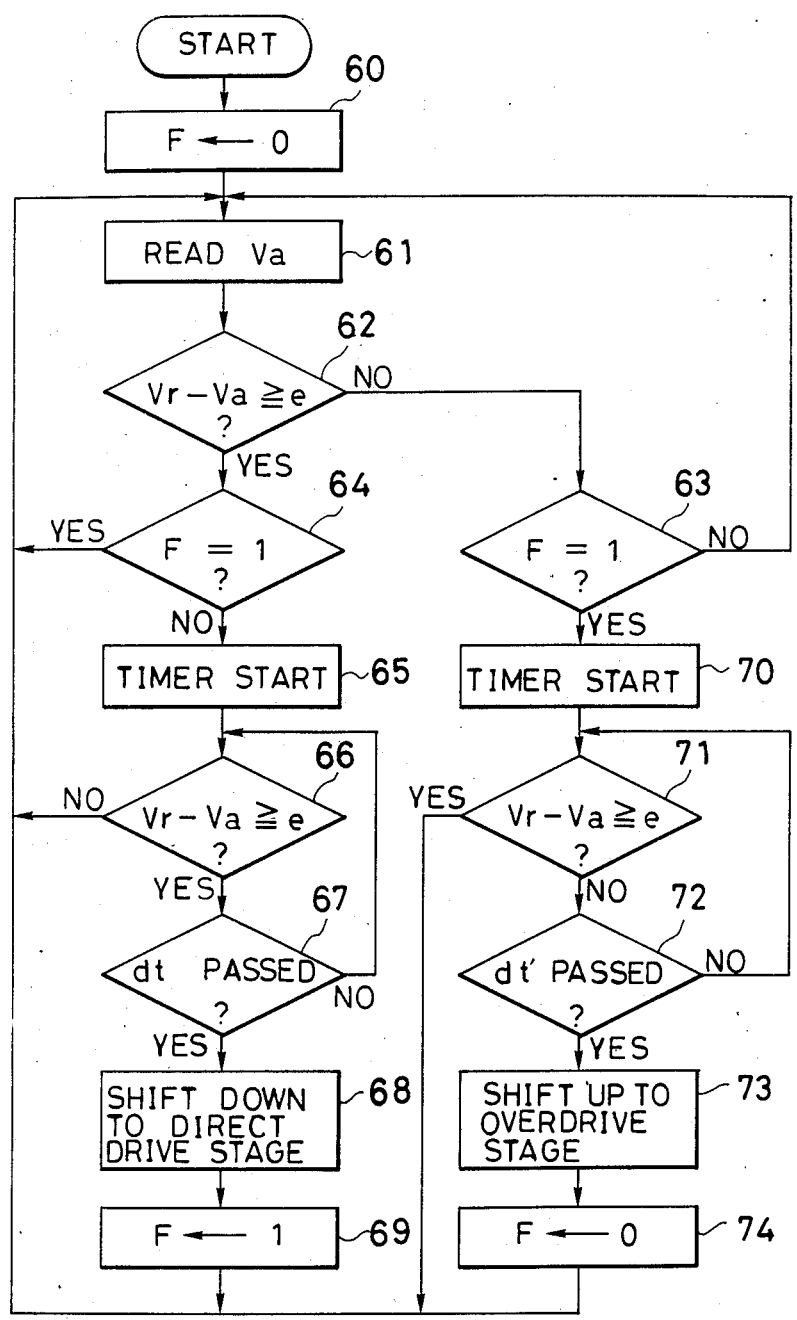
FIG. 6 is a program flow chart showing the transmission shift control.

Referring now to FIG. 6, there is shown a program flow for the gear shift control. Assuming that the vehicle is running with the transmission in the overdrive gear stage, the flag is at first set to 0 in the step 60 to designate that the transmission is in the overdrive gear stage. Then, the actual vehicle speed $V_a$ is read in the step 61 and the speed $V_a$ is compared with the reference speed $V_r$ in the step 61. If the difference between the reference speed $V_r$ and the actual speed $V_a$ is smaller than the predetermined value e, judgement is made in the step 63 as to whether the flag is in the position 1 or not. If the flag is not in the position 1, the step 61 is repeated.

When it is found that the difference between the reference speed $V_r$ and the actual speed $V_a$ is not smaller than the value e, a judgement is made in the step 64 as to whether the flag is in the position 1 or not. If the flag is in the position 1, the step 61 is repeated. If the flag is not in the position 1, the timer is started in the step 65.

Then, the step 66 is carried out to judge whether the difference between the reference speed $V_r$ and the actual speed $V_a$ is not smaller than the value e. If the difference is smaller than the value e, the procedure is returned to the step 61. If the difference is not smaller than the value e, a judgement is made in the step 67 as to whether the time period dt has passed. In case where the time period dt has not passed, the step 66 is repeated. When the time period dt has passed, a high level signal $S_d$ is produced in the step 68 to shift down the gear mechanism 6a to the direct drive stage. Then, the flag is set to the position 1 and the procedure is repeated from the step 61.

When it is found that the flag is in the position 1 in the step 63, the timer is started in the step 70 and a judgement is made in the step 71 as to whether the difference between the reference speed $V_r$ and actual speed $V_a$ is not smaller than the value e. If the difference is not smaller than the value e, the procedure is returned to the step 61. If the difference is smaller than the value e, the step 72 is carried out to find out whether the time period dt' has passed or not. When it is found that the time period dt' has not passed, the step 71 is repeated. When the time period dt' has passed, the control unit 22 produces a low level signal in the step 73 which is applied to the transistor 38 to deenergize the solenoid coil 12. Thus, the downshift solenoid valve 234 is opened to shift the overdrive gear mechanism 6a up to the overdrive gear stage.

When the vehicle comes to a downhill slope, the load on the engine decreases so that the engine throttle valve 18 is gradually closed. Depending on the steepness of the slope and the desired speed, the vehicle speed may continue to increase even when the throttle valve 18 is closed to the minimum opening position as shown in FIG. 7. When the actual vehicle speed is increased beyond the reference speed by a value e at a timing $t_1$, the control unit 22 starts to count the time. After the first time period dt, the gear machanism 6a is shifted down to the direct drive stage. Thus, the engine brake effect is increased to thereby decelerate the vehicle. As the vehicle speed is decreased to a value where the difference between the reference speed $V_r$ and the actual speed $V_a$ is equal to the value e at a second timing $t_3$, the control unit 22 starts to count the time. At a timing $t_4$ where the time period dt' has passed, the control unit 22 produces a low level signal to shift the gear mechanism 6a to the overdrive stage.

The first time period dt may be determined in accordance with the rate of change in the vehicle speed. In a preferable aspect, the time period dt is decreased in response to an increase in the rate of change in the vehicle speed. The second time period dt' may also be changed in accordance with the rate of change in the vehicle speed. For example, the time period dt' may be increased in response to an increase in the rate of change in the vehicle speed. Such controls can be performed by inserting the step of calculating the rate of change in the vehicle speed after the step 61 and steps of determining the time periods dt and dt' between the steps 66 and 67 and between the steps 71 and 72, respectively, in FIG. 6.

Figure 8A:
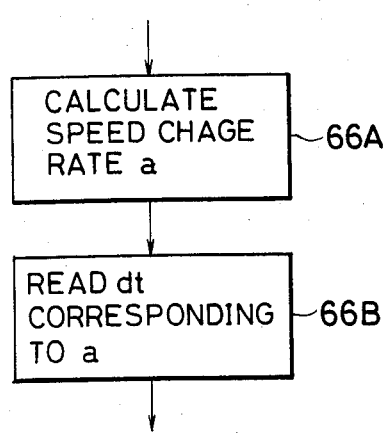
FIG. 8A is a flow diagram showing a modified control wherein the delay time is changed in accordance with the rate of change in the vehicle speed.
Figure 8B:
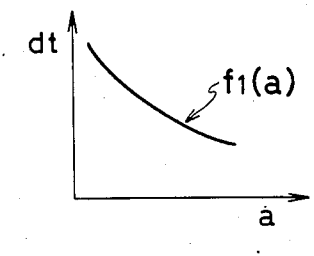
FIG. 8B is a diagram showing the relationship between the delay time and the speed change rate.
Figure 9A:
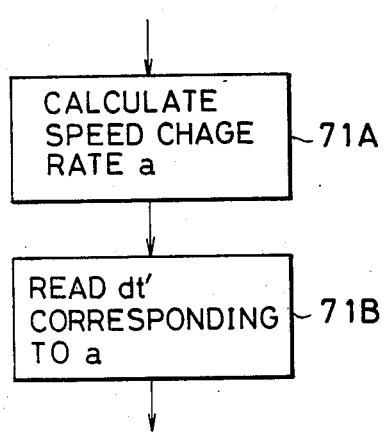
FIG. 9A is a flow chart similar to FIG. 8A but showing the control in determining the delay time for a shift up control; and, FIG. 9B is a diagram showing the delay time chart used in the process of FIG. 9A.
Figure 9B:
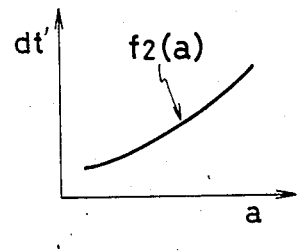

Referring to FIG. 8A, the step 66A is carried out to calculate the rate a of change in the vehicle speed and then the step 66B is carried out to read the value dt in the map shown in FIG. 8B. Further, as shown in FIG. 9A, the rate a of change in the vehicle speed is calculated in the step 71A which is carried out after the step 71 and the value dt' is read in the step 71B from the map shown in FIG. 9B.

The invention has thus been shown and described with reference to preferred embodiments, however, it should be noted that the invention is in no way limited to the details of the arrangements specifically described but changes and modifications may be made without departing from the scope of the appended claims.

We claim:

1. A vehicle automatic cruise speed control system including gear stage shifting means for effecting shifting operations of gear stages of a vehicle automatic transmission, engine output control means for controlling the output of a vehicle engine, vehicle speed detecting means for detecting vehicle speed and producing a vehicle speed signal, first control means responsive to said vehicle speed signal and controlling said first control means in accordance with the vehicle speed signal for maintaining the vehicle speed at a desired value, speed descriminating means for producing a deviation signal when the vehicle speed signal is deviated from a reference signal representing the desired speed by a predetermined value, second control means responsive to said deviation signal for actuating said gear stage shifting means to shift down said gear stages of the automatic transmission when the deviation signal is continuously received for a first predetermined time period and to shift up said gear stages of the automatic transmission when the deviation signal is not continuously received for a second time period from a time when the deviation signal has disappeared.

2. A vehicle automatic cruise speed control system in accordance with claim 1 in which said first time period is shorter than said second time period.

3. A vehicle automatic cruise speed control system in accordance with claim 2 in which said first and second time periods are variable in accordance with a rate of change in the vehicle speed.

4. A vehicle automatic cruise speed control system in accordance with claim 3 in which said first time period is decreased in response to an increase in the rate of change in the vehicle speed and said second time period is increased in response to an increase in the rate of change in the vehicle speed.

5. A vehicle automatic cruise speed control system in accordance with claim 1 in which said first time period is variable in accordance with a vehicle operating condition.

6. A vehicle automatic cruise speed control system in accordance with claim 1 in which said second time period is variable in accordance with a vehicle operating condition.

7. A vehicle automatic cruise speed control system in accordance with claim 5 in which said first time period is decreased in response to an increase in a rate of change in the vehicle speed.

8. A vehicle automatic cruise speed control system in accordance with claim 6 in which said second time period is increased in response to an increase in a rate of change in the vehicle speed.

9. A vehicle automatic cruise speed control system in accordance with claim 1 in which said engine output control means is engine throttle valve means for controlling engine intake air flow.

10. A vehicle automatic cruise speed control system in accordance with claim 9 in which throttle actuating means is provided to operate said throttle valve means.

11. A vehicle automatic cruise speed control system in accordance with claim 10 in which said throttle actuating means is of a negative pressure operated type.

12. A vehicle automatic cruise speed control system in accordance with claim 1 in which said transmission means includes an overdrive gear stage and a direct drive gear stage, said second control means including means for controlling shifting operations between the overdrive gear stage and the direct drive gear stage.

13. A vehicle automatic cruise speed control system in accordance with claim 12 in which said transmission means includes solenoid means for shifting between the overdrive and direct drive gear stages.

* * * * *